United States Patent [19]
Sakai et al.

[11] Patent Number: 5,654,244
[45] Date of Patent: Aug. 5, 1997

[54] PROCESS FOR PRODUCING SEMICONDUCTOR STRAIN-SENSITIVE SENSOR

[75] Inventors: Minekazu Sakai, Kariya; Tsuyoshi Fukada, Aichi; Hiroshige Sugito, Nagoya, all of Japan

[73] Assignee: Nippondenso Co., Ltd., Kariya, Japan

[21] Appl. No.: 427,960

[22] Filed: Apr. 26, 1995

[30] Foreign Application Priority Data

Apr. 27, 1994 [JP] Japan ................................. 6-089467
Mar. 23, 1995 [JP] Japan ................................. 7-064394

[51] Int. Cl.$^6$ ........................................... H01L 21/46
[52] U.S. Cl. .................. 438/53; 361/283.4; 438/384; 438/751; 438/754
[58] Field of Search .................... 437/225, 228, 437/228 O, 228 H, 228 SEN, 901, 921, 928, 60; 156/656.1, 657.1, 662.1; 361/283.4

[56] References Cited

U.S. PATENT DOCUMENTS

| | | | |
|---|---|---|---|
| 3,938,175 | 2/1976 | Jaffe et al. | 437/901 |
| 4,597,003 | 6/1986 | Aine et al. | 437/228 |
| 4,783,237 | 11/1988 | Aine et al. | 437/15 |

FOREIGN PATENT DOCUMENTS

| | | |
|---|---|---|
| 58-150852 | 10/1983 | Japan . |
| 59-138383 | 8/1984 | Japan . |
| 61-54267 | 11/1986 | Japan . |

*Primary Examiner*—Charles L. Bowers, Jr.
*Assistant Examiner*—Matthew Whipple
*Attorney, Agent, or Firm*—Cushman, Darby & Cushman IP Group of Pillsbury Madison & Sutro LLP

[57] ABSTRACT

In the present invention, a first protective layer formed over a diaphragm is prevented from being etched unnecessarily at the time of etching a second protective layer, and the detection accuracy of the diaphragm is improved.

In a process for producing a semiconductor pressure sensor, a first protective layer 4, a metal layer 8 and a second protective layer 6 are successively formed by deposition over a diaphragm 1a, and the second protective layer 6 is removed by etching so that the second protective layer 6 is left on a predetermined portion of an electrode 5. Since the metal layer 8 acts as an etching stopper layer at the time of removing the second protective layer 6 by etching, the first protective layer 4 over the diaphragm 1a is prevented from being etched. The metal layer 8 is removed by etching thereafter so that only the first protective layer 4 is formed over the diaphragm 1a.

20 Claims, 9 Drawing Sheets

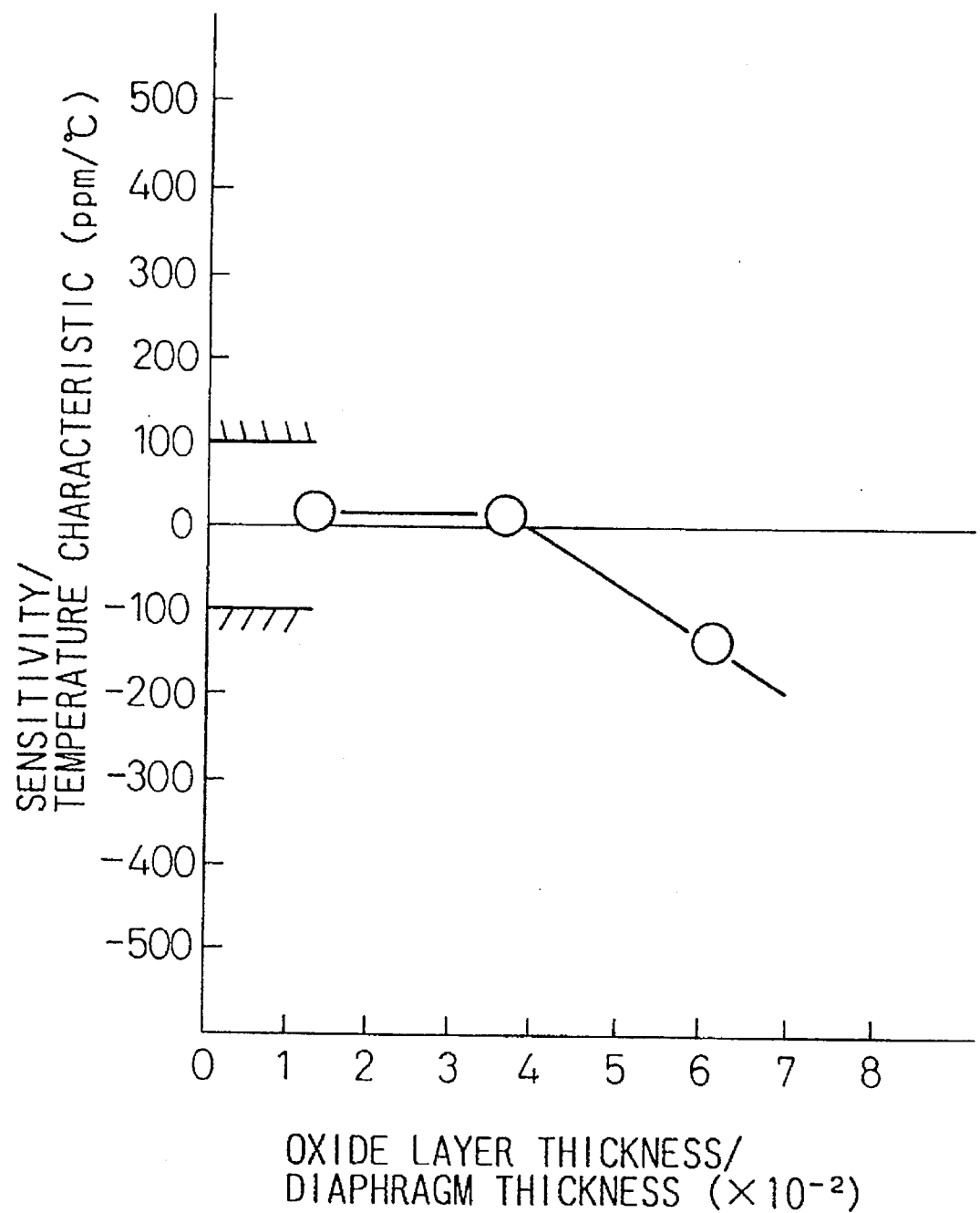

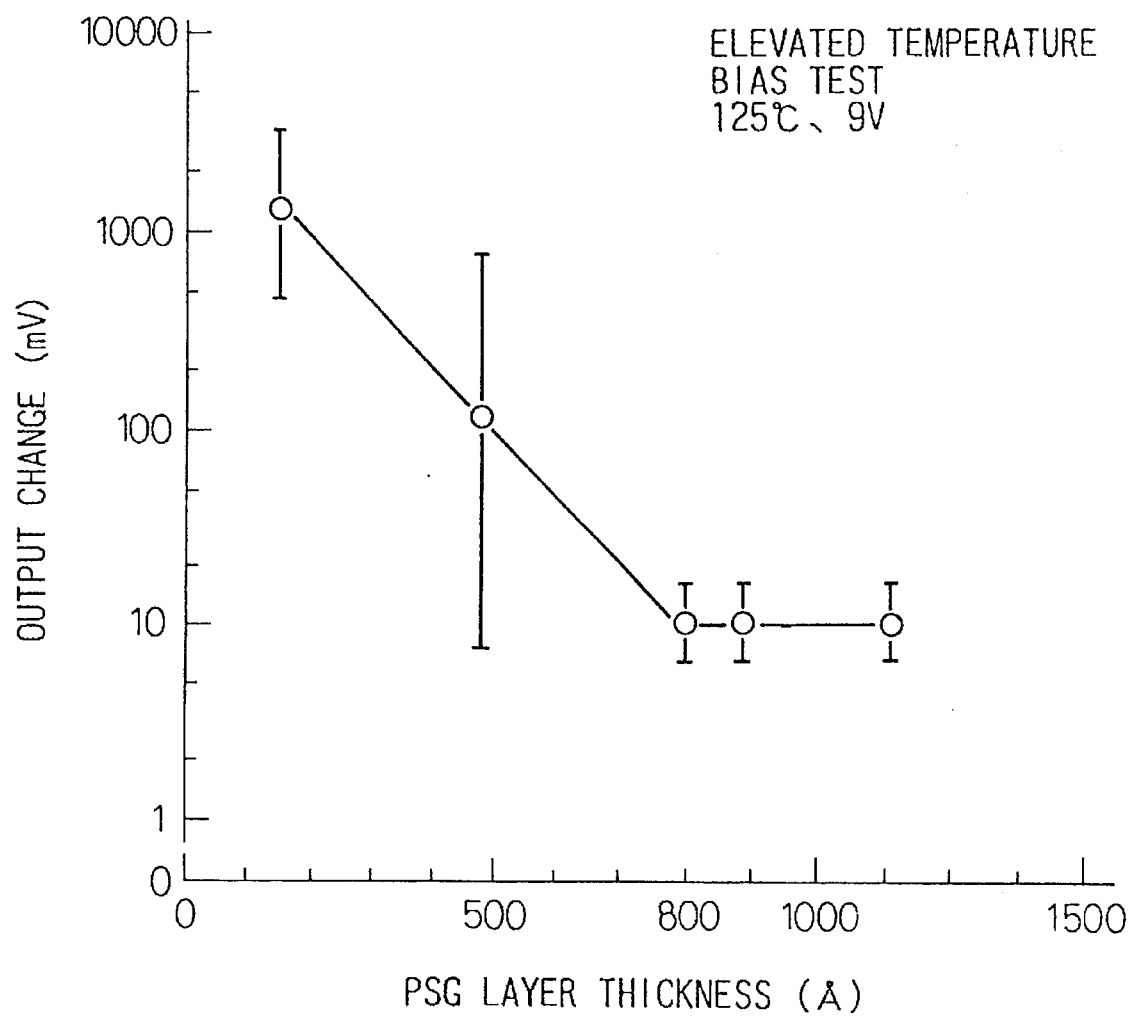

PROCESS FOR PRODUCING SEMICONDUCTOR STRAIN-SENSITIVE SENSOR

BACKGROUND OF THE INVENTION

1. Field of the Invention

The present invention relates to a process for producing a semiconductor strain-sensitive sensor which detects a stress, for example, a semiconductor pressure sensor having a diaphragm.

2. Description of the Related Art

A conventional semiconductor pressure sensor has a first protective layer formed on a diaphragm (displacement portion) which displaces when subjected to pressure, and a second protective layer formed on an electrode, through which an electric signal in accordance with the displacement of the diaphragm is taken out, to protect the electrode.

In the process for producing such a semiconductor pressure sensor, the first and the second protective layers are formed over the whole surface of the semiconductor substrate, and the second protective layer over the region to become the diaphragm (merely referred to as over the diaphragm hereinafter) is removed. Since the second protective layer remaining thereover causes a variation in the offset voltage and degrades the temperature characteristics and the linearity in the detection output, the second protective layer is removed.

However, since the first protective layer is a $SiO_2$ type layer and the second protective layer is a $SiO_2$ type layer, a SiN type layer or $SiO_2$ and SiN type composite layer, the first protective layer is also etched at the time of etching the second protective layer. As a result, there arises a problem that the accuracy of detecting the displacement of the diaphragm is degraded.

The problem as described above will be outlined in accordance with the process for producing a conventional semiconductor pressure sensor.

Firstly, as shown in FIG. 7(a), the first protective layer 4 is formed over the whole surface of the semiconductor substrate 1 on which output resistors 2 and piezo resistors (gauge resistors) 3 have been formed. Wiring 5 is then formed by forming a contact portion by a conventional method, and the second protective layer 6 is deposited over the whole surface, followed by forming a resist pattern 7 having an opening over the diaphragm (FIG. 7(b)). The second protective layer 6 over the diaphragm is subsequently removed by etching as shown in FIG. 7(c).

In the case where the first protective layer 4 is a PSG layer 2,000 Å thick and the second protective layer 6 is a CVD $SiO_2$ layer 5,000 Å thick, the second protective layer 6 is removed by wet etching with HF, HF-$CH_3COOH$, etc. or dry etching with $CH_4$, $SF_6$, etc. Since the second protective layer 6 has a uniformity of the layer thickness of ±20% over the wafer surface, the etching time becomes just equal to the etching time+the over etching time (which is equal to 20% of the etching time). Since the etching selectivity of the first protective layer 4 to the second protective layer 6 is from ⅔ to ½, the first protective layer 4 over the wafer surface is also etched when the second protective layer 6 is etched. As a result, the first protective layer comes to have a thickness of from 0 to 1,500 Å, and has a reduced or no function as a protective layer.

Even when the combination of the material of the first protective layer 4 and that of the second protective layer 6 is changed, there still remains the problem that the first protective layer 4 is etched at the time of etching the second protective layer 6 due to the thickness distributions of the protective layers and the lack of etching selectivity of the first protective layer 4 to the second protective layer 6.

As described above, when the first protective layer 4 over the diaphragm is etched at the time of etching the second protective layer 6, the first protective layer 4 may have a reduced function as a protective layer. As a result, there arises a problem that the gauge resistors 3 formed over the diaphragm will have a degraded resistance to the environment.

SUMMARY OF THE INVENTION

The present invention has been achieved in view of the problem as mentioned above, and an object of the present invention is to prevent the first protective layer from being etched when the second protective layer is etched and improve the accuracy of detecting a displacement portion such as a diaphragm.

In the present invention, attention has been paid to the poor selectivity to the first protective layer, which is a base layer to the second protective layer, during etching the second protective layer in the conventional semiconductor sensor, and a metal layer is deposited before depositing the second protective layer so that the first protective layer is prevented from being etched by the use of the metal layer as an etching stopper layer.

From the standpoint as described above, a first aspect of the present invention has been achieved as follows:

a process for producing a semiconductor strain-sensitive sensor wherein a first protective layer is formed over a region of the semiconductor substrate which is to form a displacement portion, and a second protective layer is formed on an electrode through which an electric signal in accordance with the displacement of the displacement portion is taken out, comprising the steps of forming said first protective layer, and subsequently forming a metal layer over said first protective layer, forming said second protective layer over the metal layer, removing said second protective layer over said region by etching while said metal layer is allowed to act as an etching stopper layer, and removing said metal layer over said region.

A second aspect of the present invention is as follows:

a process for producing a semiconductor strain-sensitive sensor having a displacement portion which displaces when subjected to a stress and which is formed in a region of the semiconductor substrate to form the displacement portion, comprising the steps of forming a detector which detects a displacement in said region, and at the same time forming a first protective layer over said region, forming a metal layer on a contact portion, which is electrically connected to said detector and over said first protector layer, forming a second protector layer over the metal layer, and removing said second protective layer over said region while said metal layer is allowed to act as an etching stopper layer, and subsequently removing said metal layer over said region so that said first protective layer is left over said region and said metal layer and said second protective layer are left on said contact portion.

A third aspect of the present invention is as follows:

a process for producing a semiconductor strain-sensitive sensor having a displacement portion which displaces when subjected to a stress and which is formed in a diplacement region of the semiconductor substrate to form the displacement portion, comprising the steps of forming a detector which detects a displacement in said displacement region, forming a circuit component through which an electric signal generated from said detector is processed, in another region of said semiconductor substrate, and further forming a first protective layer over said semiconductor substrate, forming a first metal layer over the first protective layer, removing said first metal layer over resistors constituting a complete circuit in cooperation with said circuit constituent, and forming a resistor layer over the whole surface of the semiconductor substrate, removing said resistor layer by etching so that said first metal layer is allowed to act as an etching stopper layer while a portion of said resistor layer for forming the resistor pattern of said resistors is left, removing said first metal layer, forming a second metal layer over the whole surface of said semiconductor substrate, and forming a pattern so that an electrode wiring pattern of said detector and said circuit constituent is formed while said second metal layer is allowed to remain over said displacement region, forming a second protective layer over the whole surface of said semiconductor substrate and removing said second protective layer by etching so that a portion necessary for protecting said electrode wiring is left while said second metal layer is allowed to act as an etching stopper layer over said displacement region, and removing thereafter the second metal layer over said displacement region.

In the first aspect of the present invention, the first protective layer is formed first, the metal layer is formed on the first protective layer, and the second protective layer is then formed on the metal layer. The metal layer acts as an etching stopper layer at the time of etching the second protective layer, and prevents the first protective layer from being etched. As a result, the first protective layer over a region of the semiconductor substrate to form the displacement portion is not influenced by the etching of the second protective layer, and the accuracy of detecting the displacement of the displacement portion, such as a diaphragm, can be improved.

In the second aspect of the present invention, since formation of the metal layer over the first protective layer is carried out simultaneously with formation of the electrode, the present invention is effective in that the step of forming the metal layer over the first protective layer is not necessarily added.

In the third aspect of the present invention, etching at the time of forming the resistor pattern on the semiconductor substrate and etching at the time of forming the second protective layer are carried while the respective metal layers are interposed so that the first protective layer is not influenced by such etching. As a result, the present invention is effective in that the circuit constituent having the resistor pattern is formed on the semiconductor substrate while the first protective layer over the displacement portion is not damaged.

BRIEF DESCRIPTION OF THE DRAWINGS

FIG. 2 is a graph showing the relationship between the ratio of an oxide layer thickness to a diaphragm thickness and a sensitivity/temperature characteristic.

FIG. 3 is a graph showing the relationship between a PSG layer and an output change.

DESCRIPTION OF THE PREFERRED EMBODIMENTS

Example 1

Figure 1:
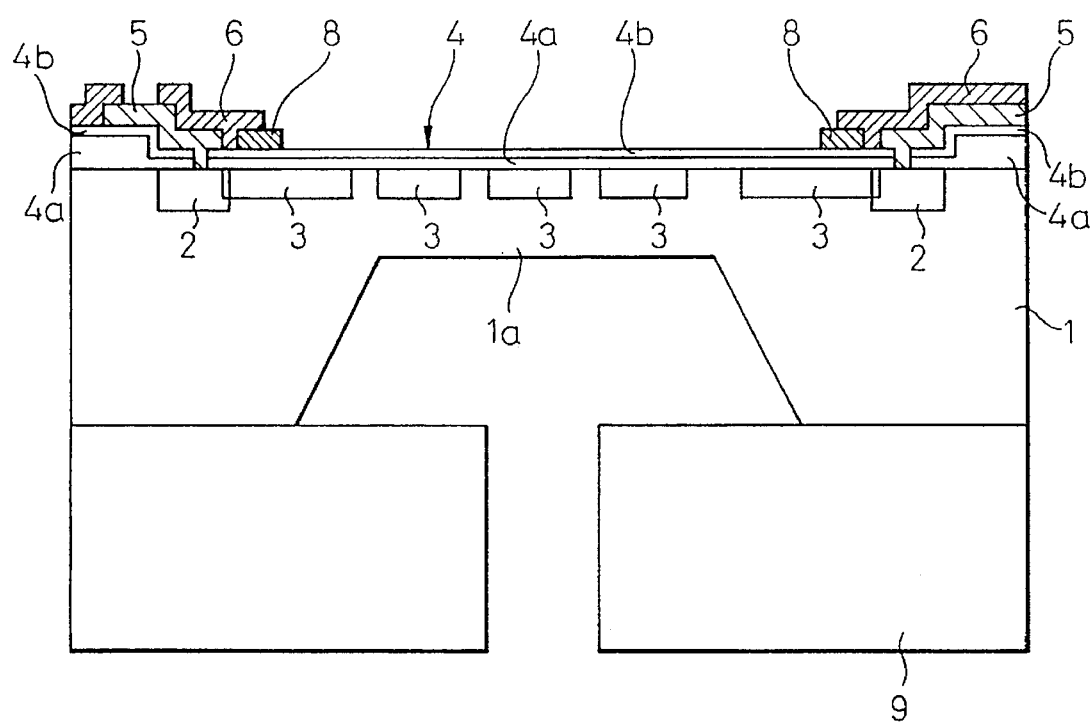
FIG. 1 is a cross sectional view showing the construction of a semiconductor pressure sensor.

FIG. 1 is a cross sectional view of a semiconductor pressure sensor prepared in Example 1 of the present invention.

A silicon substrate 1 having a diaphragm 1a is anodically joined to a seating 9, and a pressure is applied to the diaphragm 1a through the seating 9. Output resistors 2 and gauge resistors 3 are formed on the silicon substrate 1, and an electric signal in accordance with the displacement of the diaphragm 1a is taken out from the output resistors 2 through an electrode 5.

A first protective layer 4 alone consisting of a double layer structure oxide layer having a $SiO_2$ layer 4a and a PSG layer 4b is formed over the diaphragm region. The first protective layer 4 and a second protective layer 6 are formed outside the diaphragm region. The first protective layer 4 protects the PN junction in the diaphragm region while the second protective layer 6 protects the electrode 5. The material of the second protective layer 6 is $SiO_2$ type ($SiO_2$, PSG, BPSG, TEOS, etc.) or SiN type ($SiN_x$, $SiO_xN_y$, etc.), or a composite layer of $SiO_2$ type and SiN type.

In addition, to prevent the first protective layer 4 over the diaphragm 1a from being etched at the time of etching the second protective layer 6, a metal layer 8 is formed. The metal layer 8 is removed after etching the second protective layer 6. As a result, only the first protective layer 4 covers the diaphragm 1a. The metal layer 8 is formed with the same material as the electrode 5 and in the same step in a production process which will be described later.

In addition, in the first protective layer 4 of an oxide film having a double layer structure comprising the $SiO_2$ layer 4a and the PSG layer 4b, the thickness of the oxide layer over the diaphragm influences the temperature characteristic of the detection output due to the stress caused by a thermal expansion coefficient difference. The relationship between the ratio of the oxide layer thickness to the diaphragm thickness and the sensitivity/temperature characteristic has been investigated, and the results are shown in FIG. 2. It can be seen from FIG. 2 that the characteristic change brought about by the thermal expansion coefficient difference caused stress can be suppressed so long as the ratio of the oxide layer thickness to the diaphragm thickness is up to about $3.7 \times 10^{-2}$.

Furthermore, to prevent the output change caused by contamination with Na ions, the PSG layer 4b is formed as a phosphorus-containing layer on the SiO$_2$ layer 4a. FIG. 3 shows experimental results exhibiting the relationship between the PSG layer thickness and the output change. In addition, an experiment has been carried out to measure the output change at an atmospheric temperature of 125° C. and an operating voltage of 9 V. It can be seen from FIG. 3 that the output change can be reduced when the PSG layer has a thickness of at least about 800 Å.

Accordingly, it is preferred that the first protective layer 4 having a PSG layer/SiO$_2$ layer double structure should have an (oxide film thickness)/(diaphragm thickness) ratio $\leq 3.7 \times 10^{-2}$, and the PSG layer thickness $\geq 800$ Å.

FIG. 4(a)–4(j) show a process for producing the semiconductor pressure sensor as described above.

A silicon wafer 1 having a plane orientation (110) or (100) is prepared by subjecting a N-type layer to epitaxial growth over a N-type or P-type semiconductor substrate. The silicon wafer 1 is heat treated at a temperature of 800° to 1,100° C. to be oxidized (oxidation with O$_2$ or wet O$_2$) and form a SiO$_2$ layer 10 having a thickness of 5,000 to 10,000 Å (FIG. 4(a)).

Next, a resist pattern 11 having openings for the output resistors is formed. The oxide layer 10 is then removed by wet etching with a solution of HF type or dry etching with a CF$_4$ gas, followed by forming a P layer which forms the output resistors 2 (FIG. 4(b)).

Figure 4A:
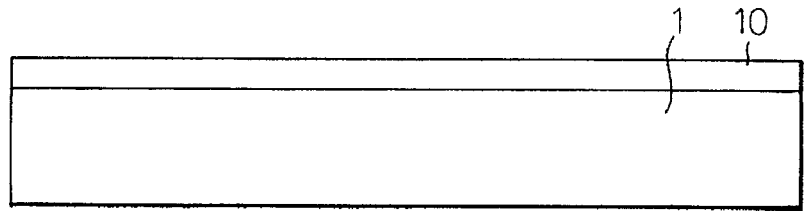
FIG. 4(a)–4(j) are cross sectional views showing the steps of a process for producing a semiconductor pressure sensor in Example 1 of the present invention.
Figure 4B:
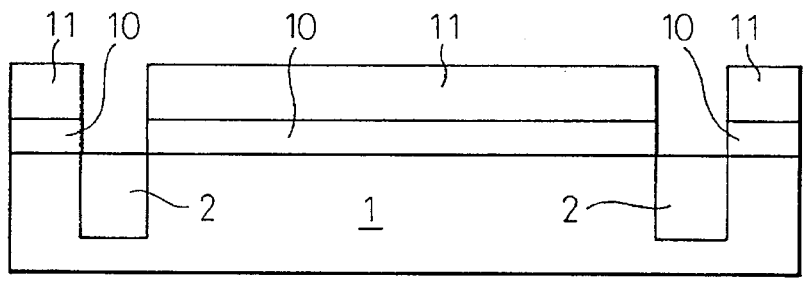
Figure 4C:
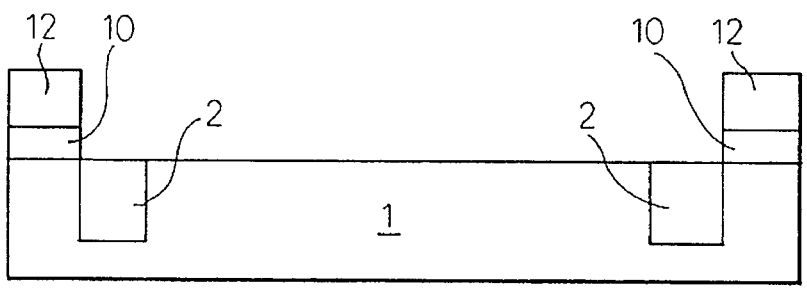
Figure 4D:
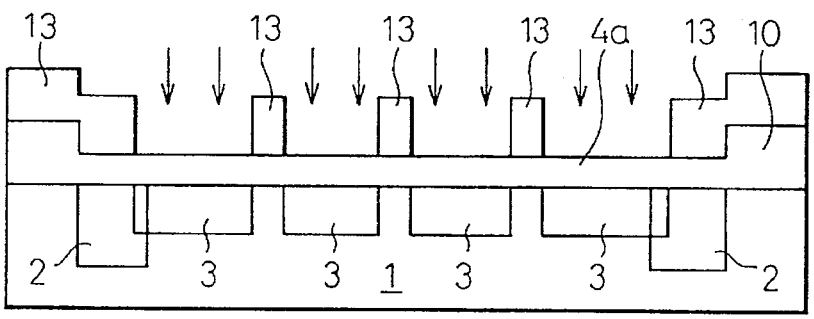

Next, a resist pattern 12 having an opening over the diaphragm and its periphery is formed, and the oxide layer 10 is removed by wet etching or dry etching as shown in the figure (FIG. 4(c)).

The resist pattern 12 is then removed, and a SiO$_2$ layer 4a having a thickness of 500 to 2,000 Å is formed by wet or dry oxidation at a temperature of 800° to 1,100° C. (oxidation with O$_2$ or wet O$_2$). A resist pattern 13 having openings over gauge resistors is formed, and gauge resistors 3 are formed by ion implanting boron (FIG. 4(d)).

The resist pattern 13 is then removed, and heat treatment is carried out in POCl$_3$ at a temperature of 900° to 1,000° C. for 30 to 60 minutes, whereby phosphorus is diffused in the SiO$_2$ layer 4a to form a PSG layer 4b. The oxide layer thickness over the diaphragm is determined at the time of diffusion. Accordingly, the conditions of the step of forming the SiO$_2$ layer 4a and those of the step of diffusing phosphorus (step of forming the PSG layer 4b) should be determined so that the oxide layer thickness after phosphorus treatment satisfies the following equation: (oxide layer thickness)/(diaphragm thickness) $\leq 3.7 \times 10^{-2}$. Concretely, the oxidation temperature and the oxidation time are determined at the time of forming the SiO$_2$ layer 4a so that the relationship between the oxide layer thickness and the diaphragm thickness is satisfied.

The first protective layer 4 having a double layer structure oxide layer excellent in resistance to the environment is formed over the diaphragm by the step mentioned above (FIG. 4(e)).

In addition, as another example of the production process, the PSG layer 4b may also be formed by depositing the PSG layer by CVD and heat treating the layer at a temperature of 800° to 1,100° C. in place of the step of diffusing phosphorus mentioned above.

Next, a resist pattern having openings on the contact portions is formed, and the first protective layer 4 is partially removed by wet or dry etching to form contact holes. An Al layer 5 is deposited as the metal layer over the whole surface of the first protective layer to obtain a construction as shown in FIG. 4(f).

A resist pattern 14 covering the wiring and the diaphragm region is subsequently formed, and wet etching is carried out with a mixed solution of nitric acid and phosphoric acid (FIG. 4(g)).

Figure 4E:
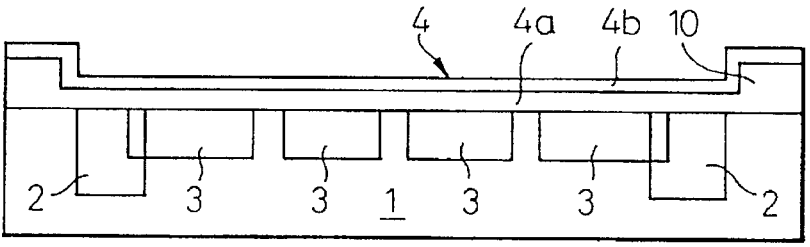
Figure 4F:
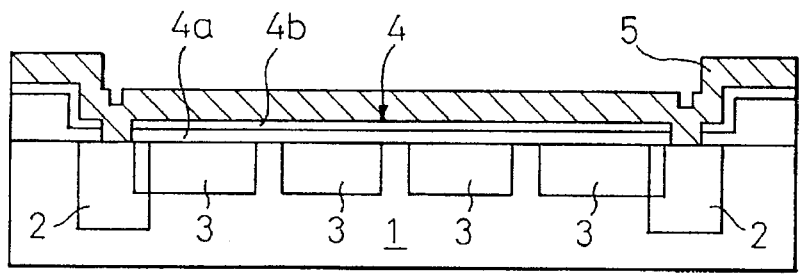
Figure 4G:
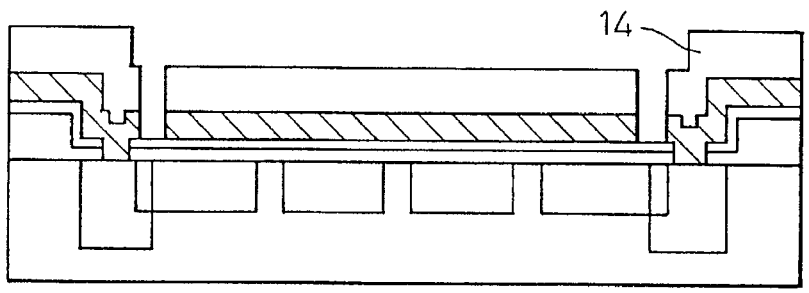
Figure 4H:
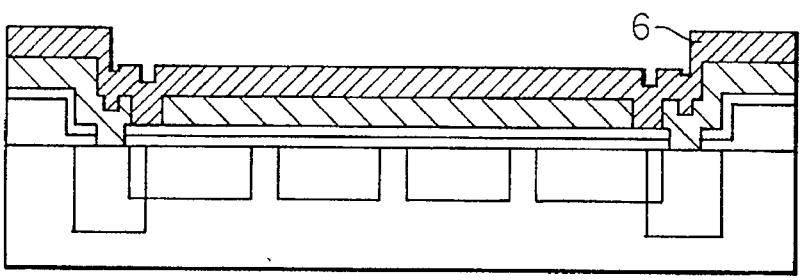

After removing the resist, a second protective layer 6 is deposited (FIG. 4(h)).

Figure 4I:
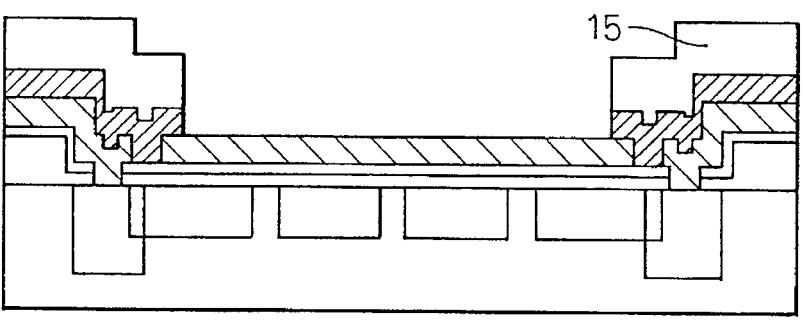

A resist pattern 15 having openings on a pad portion and over the diaphragm is formed, and the second protective layer 6 is etched (FIG. 4(i)). The first protective layer 4 over the diaphragm is not etched during etching.

Figure 4J:
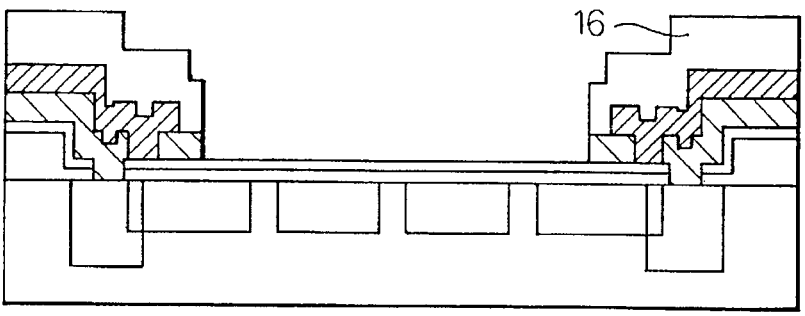

A resist pattern 16 open to the diaphragm region is formed after removing the resist, and the Al layer 5 over the diaphragm is removed by wet etching with a mixture solution of nitric acid and phosphoric acid (FIG. 4(j)). Since the etching selectivity of the Al layer to the PSG layer (first protective layer 4) for the wet etchant is at least 100/1, the PSG layer is not etched. The diaphragm 1a is then formed by a conventional step, and a structure shown in FIG. 1 is obtained.

As described above, the first protective layer 4 is formed at first, and then the Al layer 5 as the metal layer is formed over the diaphragm, followed by depositing the second protective layer 6. The metal layer, therefore, acts as an etching stopper layer when the second protective layer 6 is etched. As a result, the first protective layer 4 over the diaphragm is not etched.

Since the metal layer for preventing the first protective layer 4 from being etched is also used as Al for wiring in the example mentioned above, further formation of a metal layer for the protection is not required. However, the metal layer may also differ from Al for the wiring.

When the metal layer differs from Al for wiring, the metal layer is desirably selected so that the following conditions are satisfied; (A) the ratio of the etching rate of the second protective layer 6 to that of the metal layer is at least 10 at the time of etching the second protective layer 6 (corresponding to FIG. 4(i)), and (B) the ratio of the etching rate of the metal film to that of the first protective film 4 is at least 100.

In addition, since the gauge resistor 3 is formed by ion implanting boron in the example, the SiO$_2$ layer is interposed on the gauge resistor 3 to prevent the change of the gauge resistance caused by the reaction of boron in the gauge resistor 3 with phosphorus in the PSG layer. On the other hand, the PSG layer alone may be used where the gauge resistor 3 is not formed.

Figure 5:
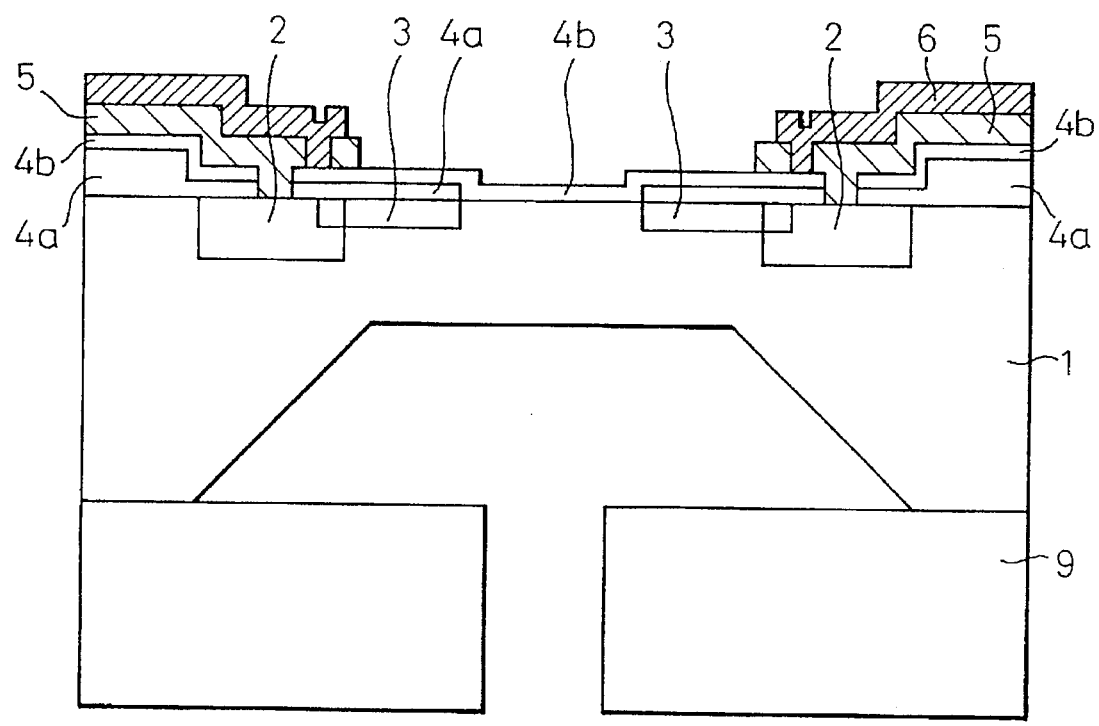
FIG. 5 is a cross sectional view showing another construction of a semiconductor pressure sensor.

Accordingly, in an example shown in FIG. 5, the first protective layer 4 has a double structure of the PSG layer 4b and the SiO$_2$ layer 4a in the region where the gauge resistor 3 is formed while the layer 4 has the PSG layer 4b alone in the region where the gauge resistor 3 is not formed.

In the same manner as in the production process as described above, the semiconductor pressure sensor shown in FIG. 5 is produced by allowing the Al layer 5 as the metal layer to act as an etching stopper layer so as not to etch the first protective layer 4 over the diaphragm.

In addition, in the first protective layer 4 having a double layer structure of the SiO$_2$ layer 4a and the PSG layer 4b, the PSG layer portion is satisfactory so long as it contains phosphorus, and therefore a BPSG layer may also be used in place of the PSG layer.

EXAMPLE 2

Next, an explanation will be given of an example of forming a thin film adjusted resistor, the resistance of which is adjusted by trimming with a laser, in a pressure detection circuit formed in a semiconductor pressure sensor. A metal layer as an etching stopper layer is also formed in the example to prevent unnecessary etching at the lower portion of the thin film resistor.

Figure 6A:
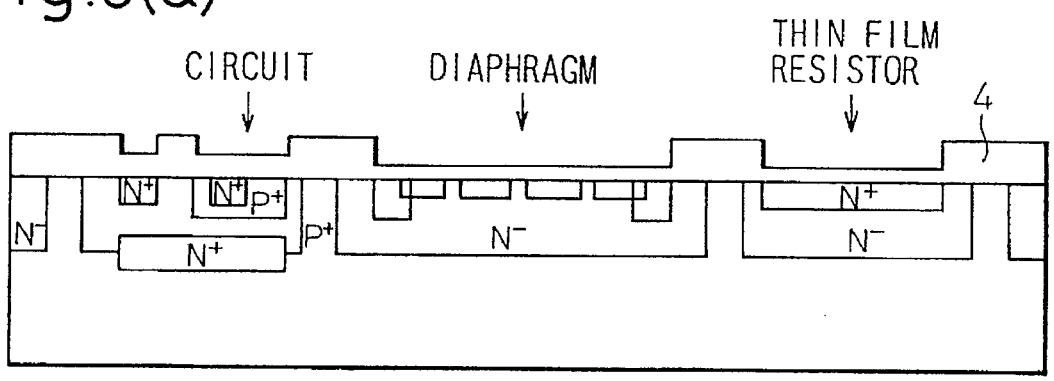
FIG. 6(a)–6(g) are cross sectional views showing the steps of a process for producing a semiconductor pressure sensor in Example 2 of the present invention.

FIG. 6(a) shows a state of forming the first protective layer 4 in the example as in FIG. 4(e). In FIG. 6(a), the central portion is a diaphragm portion having the construction as shown in FIG. 4(e). The left side is part, or a circuit component, of an amplification circuit, etc., and the right side is a thin film resistor acting as a resistor in the complete circuit.

Figure 6B:
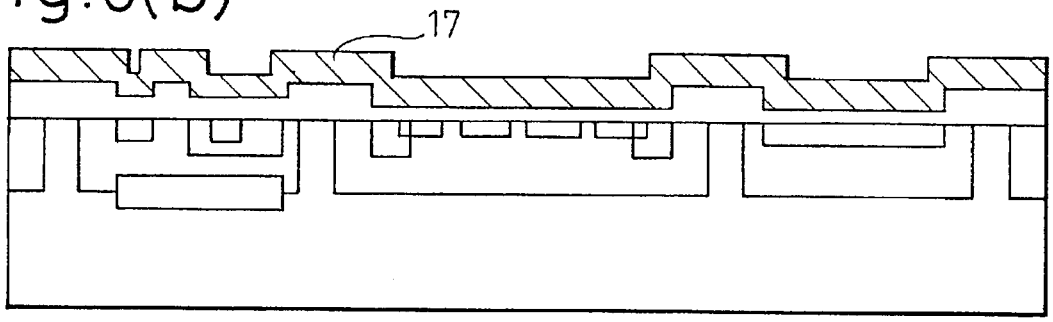

An Al metal layer 17 is formed as a first metal layer over the whole surface of the substrate as shown in FIG. 6(b).

Figure 6C:
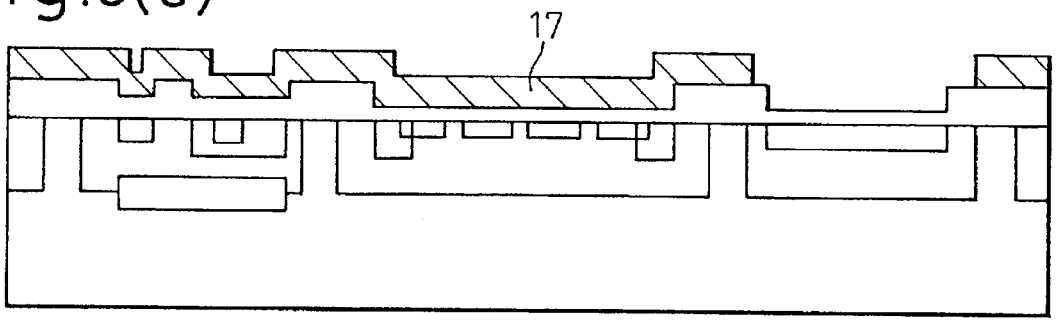

A resist pattern open to the thin film resistor is formed, and the metal layer 17 at the portion of the opening is removed by etching (FIG. 6(c)).

Figure 6D:
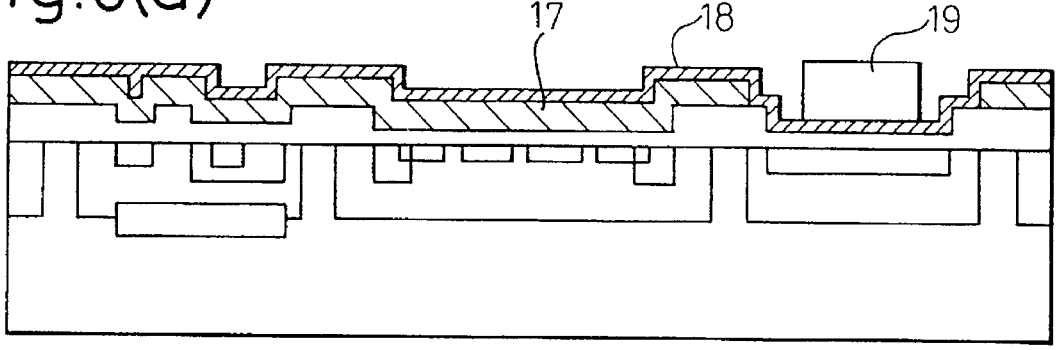

A thin film resistor (a mixture layer of chromium-silicon and titanium-tungasten) 18 is then formed over the whole surface. A resist pattern 19 is then formed in the region where the thin film resistor is to be formed (the resistor pattern being part of a complete circuit and in cooperation with the circuit component) (FIG. 6(d)).

Figure 6E:
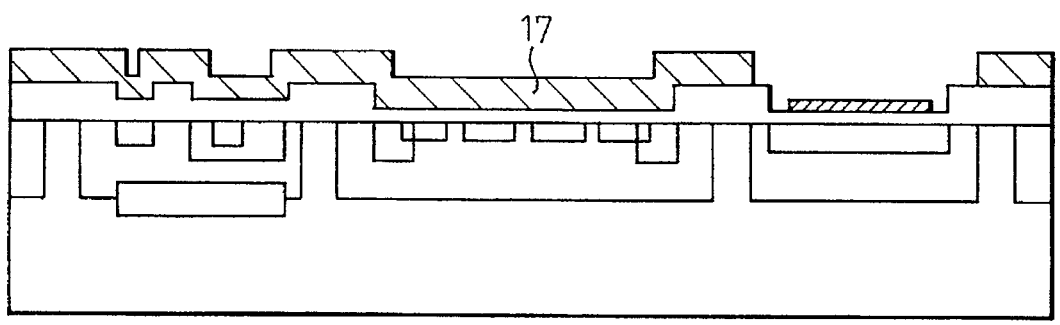

Etching is carried out using the resist pattern 19, the resist is removed, and a construction as shown in FIG. 6(e) is obtained. As a result, the metal layer 17 acts as an etching stopper layer during etching for forming the thin film resistor pattern and the first protective layer 4 over the diaphragm is prevented from being etched.

Figure 6F:
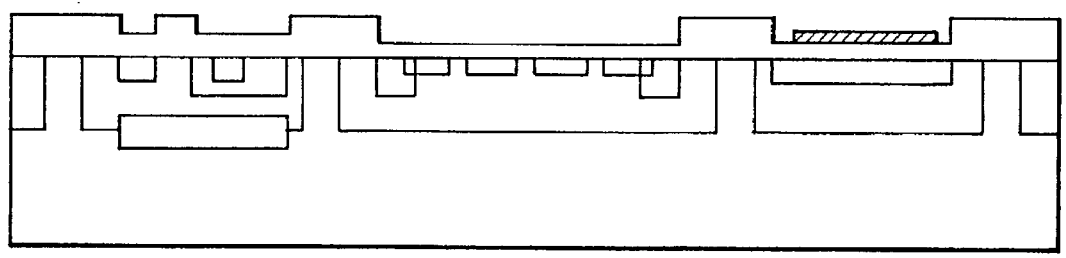
Figure 6G:
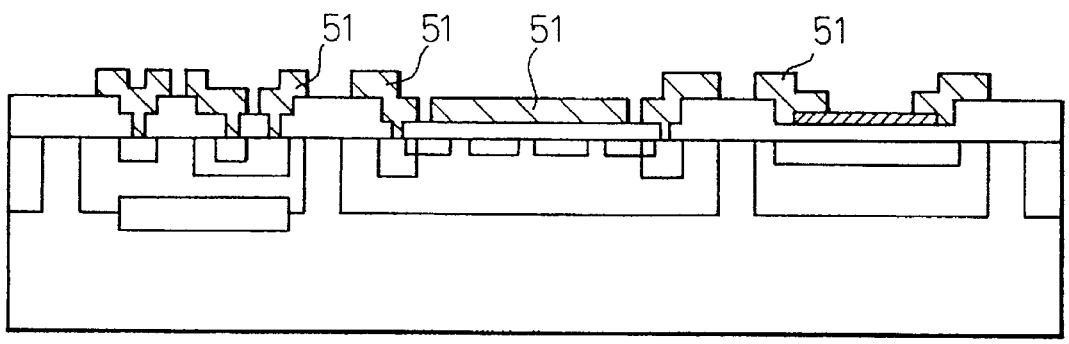
Figure 7A:
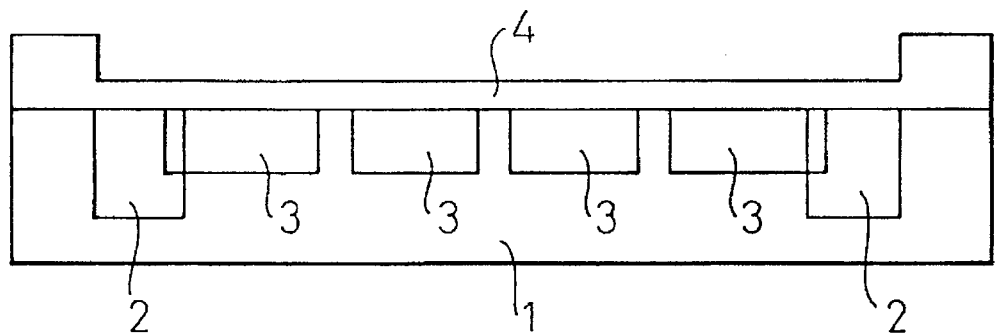
FIG. 7(a)–7(c) are cross sectional views showing the process for producing a conventional semiconductor pressure sensor.
Figure 7B:
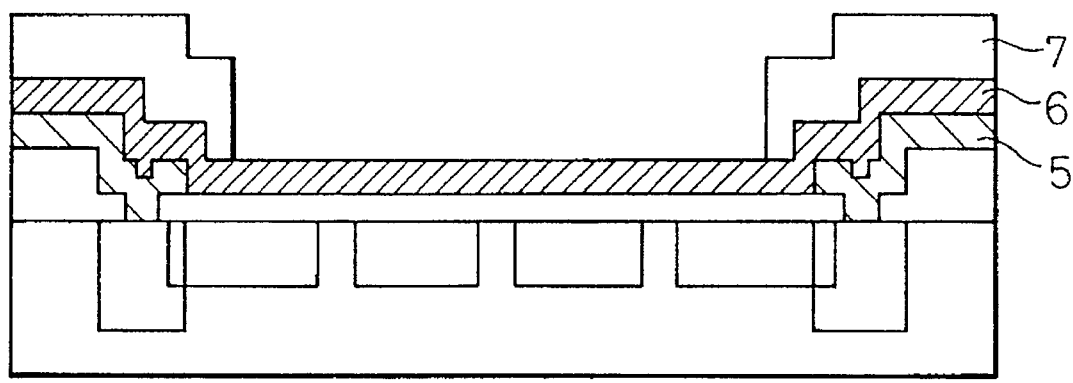
Figure 7C:
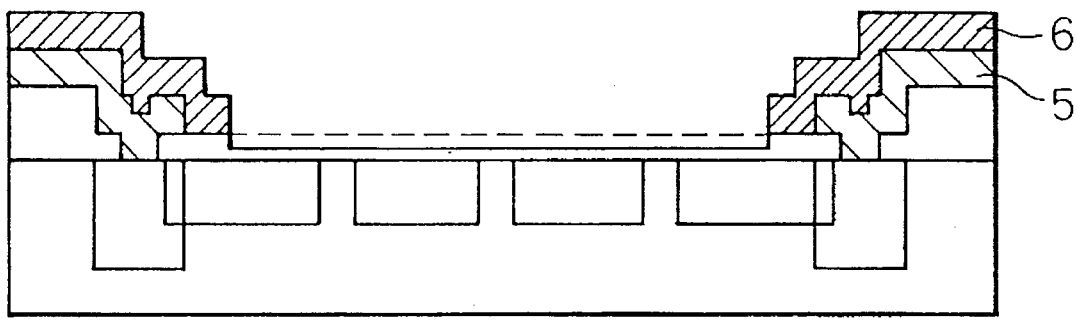

The metal layer 17 is subsequently removed (FIG. 6(f)). The resultant state corresponds to that in FIG. 4(e). An Al layer as a metal layer (second metal layer) is, therefore, formed again, and unnecessary portions are removed by etching (FIG. 6(g)). An Al layer 51 (corresponding to the Al layer 5 in FIG. 4(f)) is thus pattern formed to form the electrode, the circuit component and a portion which forms wiring to the resistor pattern and is also pattern formed on the first protective film 4.

The second protective layer 6 is then formed in the same manner as in Example 1, and the second protective layer 6 and the Al layer 5 on the diaphragm are removed so that only the first protective layer 4 is left.

According to the present example, therefore, the undesired etching of the first protective layer 4 over the diaphragm can be prevented by twice forming respective metal layers: that is, at the time of formation and removal of the thin film resistor, and at the time of formation and removal of the second protective layer 6.

In addition, though the present invention has been applied to the preparation of a semiconductor pressure sensor in the examples mentioned above, the present invention may also be applied to a sensor which has a displacement portion to be displaced when subjected to a stress and which detects the displacement, for example, an acceleration sensor. When the present invention is applied to the acceleration sensor, the beam portion thereof to be subjected to acceleration corresponds to the diaphragm portion in the pressure sensor. The first protective layer is formed on the beam, and the influence of etching the second protective layer is avoided in the same manner as described above.

We claim:

1. A process for producing a semiconductor strain-sensitive sensor wherein a first protective layer is formed over a region of the semiconductor substrate which is to form a displacement portion, and a second protective layer is formed on an electrode through which an electric signal in accordance with the displacement of the displacement portion is taken out, comprising the steps of forming said first protective layer, and subsequently forming a metal layer over said first protective layer, forming said second protective layer over the metal layer, removing said second protective layer over said region by etching while said metal layer acts as an etching stopper layer, and removing said metal layer over said region.

2. The process according to claim 1, wherein said first protective layer comprises a $SiO_2$ layer and a PSG layer.

3. The process according to claim 2, wherein the relationship between the thickness of said first protective layer and that of said displacement portion satisfies the following equation:

(thickness of first protective layer)/(thickness of displacement portion)$<3.7\times10^{-2}$.

4. The process according to claim 2, wherein the thickness of said PSG layer is at least 800 Å.

5. The process according to claim 1, wherein said electrode and said metal layer are formed in the same step.

6. The process according to claim 2, wherein said process comprises the step of forming a gauge resistor in said displacement portion after forming said first protective layer, said first protective layer has a double layer structure comprising an $SiO_2$ layer and a PSG layer over the region where the gauge resistor is formed, and a monolayer structure of only a PSG layer over the region where the gauge resistor is not formed.

7. The process according to claim 1, wherein said etching is wet etching.

8. The process according to claim 7, wherein the etching selectivity of said metal layer to said first protective layer is at least 100/1.

9. A process for producing a semiconductor strain-sensitive sensor having a displacement portion which is displaced when subjected to a stress and which is formed in a region of the semiconductor substrate to form the displacement portion, comprising the steps of forming a detector which detects a displacement in said region, and at the same time forming a first protective layer over said region, forming a metal layer on a contact portion, which is electrically connected to said detector and covers said first protector layer, forming a second protector layer over the metal layer, and removing said second protective layer over said region while said metal layer is allowed to act as an etching stopper layer, and subsequently removing said metal layer over said region so that said first protective layer is left over said region and said metal layer and said second protective layer are left on said contact portion.

10. The process according to claim 9, wherein said first protective layer comprises an $SiO_2$ layer and a PSG layer.

11. The process according to claim 9, wherein the relationship between the thickness of said first protective layer and that of said displacement portion satisfies the following equation:

(thickness of first protective layer)/(thickness of displacement portion)$<3.7\times10^{-2}$.

12. The process according to claim 10, wherein the thickness of said PSG layer is at least 800 Å.

13. The process according to claim 10, wherein said process comprises the step of forming a gauge resistor in said displacement portion after forming said first protective layer, said first protective layer has a double layer structure comprising an $SiO_2$ layer and a PSG layer over the region where the gauge resistor is formed, and only a monolayer structure of a PSG layer in the region where the gauge resistor is not formed.

14. The process according to claim 9, wherein said etching is wet etching.

15. The process according to claim 14, wherein the etching selectivity of said metal layer to said first protective layer is at least 100/1.

16. A process for producing a semiconductor strain-sensitive sensor having a displacement portion which is displaced when subjected to a stress and which is formed in a displacement region of the semiconductor substrate to form the displacement portion, comprising the steps of forming a detector which detects a displacement in said displacement region, forming a circuit constituent through which an electric signal generated from said detector is processed in another region of said semiconductor substrate, and further forming a first protective layer over said semiconductor substrate, forming a first metal layer over the first protective layer, removing said first metal layer over resistors constituting a complete circuit in cooperation with said circuit constituent, and forming a resistor layer over the whole surface of the semiconductor substrate, removing said resistor layer by etching so that said first metal layer is allowed to act as an etching stopper layer while a portion of said resistor layer, for forming the resistor pattern of said resistors, is left, removing said first metal layer, forming a second metal layer over the whole surface of said semiconductor substrate, and forming a pattern so that an electrode wiring pattern of said detector and said circuit constituent is formed while said second metal layer is allowed to remain over said displacement region, forming a second protective layer over the whole surface of said semiconductor substrate and removing said second protective layer by etching so that a portion necessary for protecting said electrode wiring is left while said second metal layer acts as an etching stopper layer over said displacement region, and removing thereafter the second metal layer over said displacement region.

17. The process according to claim 16, wherein said resistor layer comprises chromium-silicon and titanium-tungsten, and said metal layer is an aluminum layer.

18. The process according to claim 1, wherein said semiconductor strain-sensitive sensor is a semiconductor pressure sensor.

19. The process according to claim 9, wherein said semiconductor strain-sensitive sensor is a semiconductor pressure sensor.

20. The process according to claim 16, wherein said semiconductor strain-sensitive sensor is a semiconductor pressure sensor.

* * * * *